UNITED STATES PATENT OFFICE.

THOMAS DRAKE, OF HUDDERSFIELD, ENGLAND.

PROCESS OF REFINING OILS.

SPECIFICATION forming part of Letters Patent No. 471,963, dated March 29, 1892.

Application filed July 28, 1891. Serial No. 401,009. (No specimens.)

*To all whom it may concern:*

Be it known that I, THOMAS DRAKE, a citizen of Great Britain, residing at Huddersfield, in the county of York, England, have invented a certain new and useful Process of Refining Oils; and I do hereby declare the following to be a full, clear, and exact description of the invention, such as will enable others skilled in the art to which it appertains to make and use the same.

The object of my invention is to obtain a new product possessing the same or nearly the same properties as spirits of turpentine extracted from pine wood, and this I effect by converting petroleum-spirits, (benzoline,) or shale-naphtha, (used for naphtha-lamps,) or other similar hydrocarbons into the said new product.

According to my invention I place any of the above-named spirits into a suitable vessel and force therethrough one or more streams of atmospheric air, such air having preferably been dried in oxide of calcium, or, in place thereof, forty per cent. is distilled off the spirit, so as to increase its specific gravity, after which I force chlorine gas through the said spirit until the specific gravity thereof rises to .900° or 1.050°, according to the purpose for which it is required and discretion and judgment of the chemist. The time required to increase the specific gravity is ordinarily about twenty-four hours; but the time may be more or less, according to the volume of gas forced through the oil. The increase in specific gravity is caused by the substitution of the chlorine gas for a part of the hydrogen gas in the oil. In order to remove and neutralize the acid in the spirit which is formed during the action, I first blow air through and then use a solution of carbonate of soda or any suitable alkali or alkaline earth, which is afterward separated from the spirit by any well-known chemical process or processes, thereby yielding a product having practically the same properties as spirits of turpentine extracted from pine wood and which may be used for the same or like purposes.

I am aware that it is not new to use chlorine gas for the purpose of deodorizing oil.

What I claim is—

The method of treating liquid mineral hydrocarbons, such as petroleum, which consists in first concentrating the oil, then forcing chlorine gas through it until its specific gravity has increased to between .900° and 1.05°, and finally correcting the acidity of the product, substantially as set forth.

In testimony whereof I affix my signature in presence of two witnesses.

THOMAS DRAKE.

Witnesses:
THOMAS GRISDALE,
    37 *New Street, Huddersfield.*
ARTHUR B. CROSSLEY,
    *Market Place, Huddersfield.*